(12) United States Patent
Iwakawa et al.

(10) Patent No.: US 7,951,431 B2
(45) Date of Patent: May 31, 2011

(54) PROCESSES FOR PRODUCING COATING FLUID AND OPTICALLY ANISOTROPIC FILM

(75) Inventors: Yasuko Iwakawa, Ibaraki (JP); Tetsuo Inoue, Ibaraki (JP); Tadayuki Kameyama, Ibaraki (JP); Shoichi Matsuda, Ibaraki (JP)

(73) Assignee: Nitto Denko Corporation, Ibaraka-shi, Osaka (JP)

( * ) Notice: Subject to any disclaimer, the term of this patent is extended or adjusted under 35 U.S.C. 154(b) by 256 days.

(21) Appl. No.: 12/447,383

(22) PCT Filed: Aug. 26, 2008

(86) PCT No.: PCT/JP2008/065158
§ 371 (c)(1),
(2), (4) Date: Apr. 27, 2009

(87) PCT Pub. No.: WO2009/041203
PCT Pub. Date: Apr. 2, 2009

(65) Prior Publication Data
US 2010/0065974 A1  Mar. 18, 2010

(30) Foreign Application Priority Data

Sep. 26, 2007  (JP) ................................ 2007-248458

(51) Int. Cl.
*C09K 19/52* (2006.01)
*C09K 19/54* (2006.01)
*C09K 19/60* (2006.01)
*G02B 5/30* (2006.01)

(52) U.S. Cl. .................. 428/1.1; 428/1.31; 252/299.01; 252/299.5; 252/299.6

(58) Field of Classification Search .................... 428/1.1, 428/1.31; 252/299.01, 299.5, 299.6
See application file for complete search history.

(56) References Cited

U.S. PATENT DOCUMENTS

| 6,488,866 | B1 * | 12/2002 | Sahouani et al. | ........ 252/299.01 |
| 7,045,177 | B2 * | 5/2006 | Dutova et al. | .................. 428/1.1 |
| 2003/0071243 | A1 | 4/2003 | Sahouani et al. | |
| 2005/0109986 | A1 | 5/2005 | Dutova et al. | |
| 2010/0128216 | A1 * | 5/2010 | Umemoto et al. | ............ 349/194 |

FOREIGN PATENT DOCUMENTS

| JP | 9-235484 A | 9/1997 |
| JP | 2004-514018 A | 5/2004 |
| JP | 2006-328157 A | 12/2006 |
| JP | 2007-512236 A | 5/2007 |
| WO | 02/38698 A1 | 5/2002 |
| WO | 2005/051926 A1 | 6/2005 |
| WO | WO 2009128185 A1 * | 10/2009 |

OTHER PUBLICATIONS

International Search Report of PCT/JP2008/065158, date of mailing Nov. 18, 2008.

* cited by examiner

*Primary Examiner* — Shean C Wu
(74) *Attorney, Agent, or Firm* — Westerman, Hattori, Daniels & Adrian, LLP

(57) ABSTRACT

A process for the producing a coating fluid of the present invention comprises a step of adjusting a pH of the coating fluid by mixing ammonium hydroxide into an acid solution containing a lyotropic liquid crystal compound and a solvent. Further, a process for the producing an optically anisotropic film of the present invention comprises a step of obtaining an optically anisotropic film by casting the coating fluid produced by the aforementioned process for production of the coating fluid in a thin film state, followed by drying.

17 Claims, No Drawings

PROCESSES FOR PRODUCING COATING FLUID AND OPTICALLY ANISOTROPIC FILM

FIELD OF THE INVENTION

The present invention relates to processes for producing a coating fluid and an optically anisotropic film using the coating fluid. This optically anisotropic film is used as a polarizing film or a phase-contrast film.

BACKGROUND OF THE INVENTION

In a liquid crystal display (LCD), a polarizing plate or a phase-contrast plate is used to control optical rotation and birefringence of beam that passes through liquid crystals. Also, in an organic electroluminescent device (OLED), a circularly polarizing plate is used to avoid reflection of external light.

Conventionally, in such a polarizing plate, a polarizer obtained by dissolving or adsorbing iodine or a dichromatic organic dye in a polymeric film, such as a polyvinyl alcohol or the like and stretching the obtained film in one direction (stretching method) to orient dye molecules or the like has been widely used.

However, there has been a problem that polarizers produced by the stretching method are poor in heat resistance and light resistance depending on the dye or the polymeric material used. Further, a bad yield of overlapping films when producing a display panel has been raised a problem. Moreover, a film with a wide width is needed to be stretched as the display panel becomes bigger, so that a large film forming apparatus is needed, which has caused a problem.

In contrast, a method for orienting a dichromatic dye in a thin film (coating method) by coating a solution containing a dichromatic dye on a substrate, such as a glass plate or a transparent film and the like to form a thin film utilizing intermolecular interaction is well known. The coating method is getting attention because the method can produce thin polarizing plates excellent in heat resistance compared with the stretching method. It is known that a polarizing plate having preferable optical anisotropy can be obtained when using a substance for forming dye aggregates caused by intermolecular interaction, such as a lyotropic liquid crystal phase in a coating fluid as a dichromatic dye.

However, in many cases, the solution containing a dichromatic dye exhibiting a lyotropic liquid crystal phase exhibits acidity, so that a coater made of stainless steel that is ordinarily used easily becomes corrosive. Accordingly, an acid solution containing a lyotropic liquid crystal compound is neutralized with an alkaline agent, such as sodium hydroxide or the like before coating (JP 2006-328157 A (Example 1)).

The concentration range exhibiting liquid crystallinity becomes narrower when neutralizing the acid solution containing a lyotropic liquid crystal compound with sodium hydroxide, resulting in irregularity in orientation of the lyotropic liquid crystal compound in a coating film. This leads to a problem with a decrease in dichroic ratio of the coating film. Thus, processes for production of a coating fluid and an optically anisotropic film without a reduction of the dichroic ratio have been demanded.

SUMMARY OF THE INVENTION (a) It is an object of the present invention to provide a process for producing a coating fluid in which a lyotropic liquid crystal compound exhibits liquid crystallinity in a wide concentration range.

(b) It is another object of the present invention to provide a process for producing an optically anisotropic film having a high orientation degree using the coating fluid.

Inventors of the present invention carried out extensive investigations on the cause for a concentration range exhibiting liquid crystallinity to become narrower than prior to neutralization when mixing an alkaline agent, such as sodium hydroxide or lithium hydroxide into an acid solution containing a lyotropic liquid crystal compound and a solvent to be neutralized. As a result, the inventors have found out that the cause for the concentration range exhibiting liquid crystallinity to become narrower by neutralization is that aggregates of the lyotropic liquid crystal compound in the state of a solution become smaller due to the alkaline agent.

Further, as specified in the present invention, the inventors of the present invention have found out that when the acid solution containing a lyotropic liquid crystal compound and a solvent is neutralized by ammonium hydroxide as an alkaline agent, larger aggregates are formed in the solution compared to the case that sodium hydroxide or lithium hydroxide is used, which leads to obtain a coating fluid exhibiting liquid crystallinity in a wide concentration range.

It is possible to deduce the formation of large aggregates in the aforementioned coating fluid from the length of crystals (corresponding to the size of the aggregates) obtained by an X-ray diffraction measurement of an optically anisotropic film formed. For instance, while the length of crystals in the optically anisotropic film in Comparative Example 3 (the coating fluid without an addition of an alkaline agent) to be hereinafter described was 6.8 nm, the length of crystals in the optically anisotropic film in Example 1 (a coating fluid is neutralized by ammonium hydroxide) was 7.2 nm.

In addition, an optically anisotropic film having preferable dichroism (a high dichroic ratio) can be prepared using the coating fluid of the present invention. That would be because interaction among the lyotropic liquid crystal compound molecules becomes stronger by the formation of the large aggregates in the coating fluid, so that the molecules are more regularly aligned when forming a film (interaction among the lyotropic liquid crystal compound molecules is weak when the length of the crystals is short, which leads to difficulty in regularly aligning the molecules).

In a first preferred embodiment, a process for producing a coating fluid comprises a step of adjusting the pH of the coating fluid by mixing ammonium hydroxide into an acid solution containing a lyotropic liquid crystal compound and a solvent.

In a second preferred embodiment of a process for producing a coating fluid, the mixed quantity of ammonium hydroxide is 0.1 to 10 weight parts with respect to 100 weight parts of the lyotropic liquid crystal compound.

In a third preferred embodiment of a process for producing a coating fluid, M represents a cation and the lyotropic liquid crystal compound contains at least one of —$SO_3M$ group and —COOM group.

In a fourth preferred embodiment of a process for producing a coating fluid, the acid solution has a pH of 3 or lower.

In a fifth preferred embodiment of a process for producing a coating fluid, the coating fluid is adjusted to have a pH of 4 to 8 by mixing ammonium hydroxide.

In a sixth preferred embodiment of a process for producing a coating fluid, the coating fluid has a solid content concentration of 10% to 30% by weight.

In a seventh preferred embodiment of a process for producing a coating fluid, the coating fluid exhibits liquid crystallinity in a range that its solid content concentration is at least 20% to 25% by weight at 60° C.

In an eighth preferred embodiment, a process for producing an optically anisotropic film comprises a step of obtaining an optically anisotropic film by casting the coating fluid produced by the aforementioned process for producing a coating fluid in a thin film state, followed by drying.

In a ninth preferred embodiment of a process for producing an optically anisotropic film, the optically anisotropic film has a thickness of 0.1 to 1 μm.

ADVANTAGES OF THE INVENTION

The present invention provides (a) a process for producing a coating fluid in which a lyotropic liquid crystal compound can exhibit liquid crystallinity in a wide concentration range (for instance, 20% to 25% by weight) and (b) a process for producing an optically anisotropic film with a high orientation degree (for instance, its dichroic ratio is 24) using the aforementioned coating fluid.

DESCRIPTION OF THE PREFERRED EMBODIMENTS

A process for producing a coating fluid of the present invention comprises a step of adjusting a pH of a coating fluid by mixing ammonium hydroxide into an acid solution containing a lyotropic liquid crystal compound and a solvent. Further, a process for producing an optically anisotropic film of the present invention comprises a step of casting the coating fluid produced by the aforementioned process for producing a coating fluid in a thin film state, followed by drying to obtain an optically anisotropic film.

(Coating Fluid)

The coating fluid of the present invention is obtained by mixing a lyotropic liquid crystal compound, a solvent, and ammonium hydroxide. Immediately after being mixed into an acid solution, ammonium hydroxide is ionized to $NH_4^+$ ion and $OH^-$ ion in the coating fluid. Subsequently, $NH_4^+$ ion may be taken into a part of the lyotropic liquid crystal compound in the coating fluid or may exist in a state of ion in the coating fluid. Alternatively, both of these situations may be mixed.

The mixed quantity of ammonium hydroxide is preferably 0.1 to 10 weight parts with respect to 100 weight parts of the lyotropic liquid crystal compound, more preferably 1 to 5 weight parts. It is possible to adjust the acid solution to have a desired pH (for instance, pH=7).

While the method for mixing ammonium hydroxide is not particularly limited, any method, such as a method for mixing ammonium hydroxide after diluting into a hydrophilic solvent or the like can be used.

The coating fluid is preferably adjusted to have a pH of 4 to 8 by mixing ammonium hydroxide. The pH of the coating fluid is more preferably 6 to 8. An optically anisotropic film with a high orientation degree can be obtained when the pH of the coating fluid is in the aforementioned range.

The coating fluid may contain any additives. Examples of the additive include, for example, other alkaline agent, a surfactant, and an antioxidant or the like.

The coating fluid preferably has a solid content concentration of 10% to 30% by weight. A coating fluid exhibiting a stable liquid crystal phase can be obtained when its solid content concentration is in the aforementioned range. Further, the coating fluid preferably exhibits liquid crystallinity in a solid content concentration range of at least 20% to 25% by weight at 60° C. A coating fluid excellent in coating can be obtained when the coating fluid exhibits liquid crystallinity in the aforementioned range.

(Acid Solution, Lyotropic Liquid Crystal Compound)

The acid solution used in the present invention contains a lyotropic liquid crystal compound and a solvent. The acid solution preferably has a pH of 3 or lower.

The lyotropic liquid crystal compound used in the present invention is a liquid crystal compound having a property to cause a phase transition of an isotropic phase and a liquid crystal phase according to changes of the temperature and the concentration. While the liquid crystal phase to develop is not particularly limited, examples of this liquid crystal phase include a nematic liquid crystal phase, a smectic liquid crystal phase, a cholesteric liquid crystal phase and the like. Such liquid crystal phases are confirmed and identified by an optical pattern observed by a polarization microscope.

The lyotropic liquid crystal compound used in the present invention is preferably water-soluble and preferably has a hydrophilic substituent to provide water solubility. The hydrophilic substituent is preferably at least one kind of a substituent selected from a group consisting of —COOM, —$SO_3M$, —$PO_3M$, —OH, or —$NH_2$. M represents a cation and more specifically, hydrogen ion, ion of Group I metal, such as Li, Na, K or Cs, ammonium ion or the like is preferably used as M.

Examples of lyotropic liquid crystal compounds used in the present invention preferably include azo-base compounds, anthraquinone-base compounds, perylene-base compounds, quinophthalone-base compounds, naphthoquinonic-base compounds or merocyanine-base compounds. These compounds exhibit lyotropic liquid crystallinity in a solution state and can also exhibit absorption dichroism.

The azo-base compound is preferably represented by the following general formula (1):

[Chemical Formula 1]

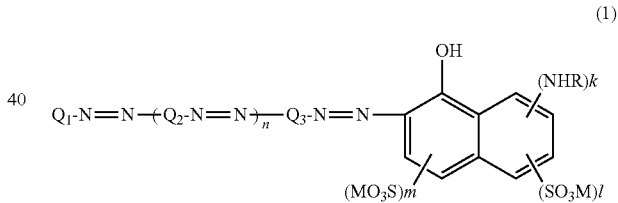

wherein $Q_1$ is a phenyl group or a naphthyl group (these groups may have a substituent). Each of $Q_2$ and $Q_3$ which are independent of each other is a phenylene group or a naphthylene group (These groups may have a substituent). R is a hydrogen atom, an alkyl group with 1 to 3 carbon atoms, an acetyl group, a benzoyl group or a phenyl group (These groups may have a substituent). k is an integer from 0 to 4, l is an integer from 0 (k+1≦4). m is an integer from 0 to 2, and n is an integer from 0 to 2. M represents a cation and is preferably a hydrogen ion, a group I metal, such as Li, Na, K, Cs, or an ammonium ion.

$Q_1$ is preferably a phenyl group having one or two substituents selected from a group consisting of a nitro group, a cyano group, a hydroxyl group, an amino group, a halogen group, a halogen alkyl group with 1 to 3 carbon atoms or an alkoxy group with 1 to 3 carbon atoms. Q3 is preferably a naphthylene group having 1 to 2 substituents selected from a group consisting of an alkyl group with 1 to 3 carbon atoms, an hydroxyl group, or a sulfonic acid group.

The solvent of the acid solvent used in the present invention is not particularly limited, as long as the solvent dissolves or uniformly disperses the lyotropic liquid crystal compound and ammonium hydroxide. Water is preferable as a solvent because water dissolves the lyotropic liquid crystal compound and ammonium hydroxide. The acid solvent may contain an alcohol, a cellsolve or their mixed solvent and the like.

(Method for Producing Optically Anisotropic Films)

A method for producing an optically anisotropic film of the present invention comprises a step of casting the aforementioned coating fluid in a thin film state, followed by drying to obtain an optically anisotropic film. The method for producing an optically anisotropic film may comprise any other steps. A typical example of such steps is, for instance, a step of laminating an optically anisotropic film on another optical film or the like.

It is preferable that the optically anisotropic film obtained by the present invention at least partially exhibits absorption dichroism in a wavelength range of 380 nm to 780 nm. For instance, such optically anisotropic film is used as a polarizer. The dichroic ratio of the optically anisotropic film obtained by the present invention is preferably 20 or higher at a wavelength of 600 nm. Further, it is possible to calculate the dichroic ratio by allowing measured light of a linear polarization to enter with a spectrophotometer so that the electric field vector of the polarization of the measured light may be parallel and orthogonal against an orientation direction of the optically anisotropic layer to measure the transmittance (The details will be described later).

The thickness of the optically anisotropic film obtained by the present invention is preferably 0.1 to 1 μm, more preferably 0.2 to 0.8 μm. An optically anisotropic film having excellent optical characteristics can be obtained when the thickness of the optically anisotropic film is in the aforementioned range.

The method for casting the coating fluid obtained in the present invention in a thin film state employs a coating method using any coaters. The method for coating is not particularly limited, as long as it is the method for uniformly coating a coating layer. Known methods, such as a rod coating method, a roll coater coating method, a flexo printing method, screen printing method, a curtain coater coating method, a spray coater coating method, and a spin coat coating method or the like may be used as appropriate. In addition, any means, such as a natural drying method and a drying oven method or the like may be used as drying means for the coated coating fluid.

The lyotropic liquid crystal compound used in the present invention can be oriented by flow when a shearing stress is applied in a liquid crystal state. In the lyotropic liquid crystal compound, supramolecular aggregates are formed in a liquid crystal state, so that the long axis direction of the supramolecular aggregates is oriented in the flow direction by applying a shearing stress to the coating fluid containing the supramolecular aggregates to be flown. In addition to the shearing stress, orientation means may be used in combination with orientation treatment, such as rubbing treatment or light orientation treatment and the like or orientation by a magnetic filed or an electric field or the like.

A shearing stress can be created by applying the coating fluid onto a substrate using the above-mentioned coater. Alternatively, the coating fluid coated on the substrate with a metal rod or a plastic rod or a plate is rubbed in one direction. Alternatively, it is possible to create a shearing stress by spraying the coating fluid onto the substrate with any injector. A shearing stress may be added when applying the coating fluid onto the substrate or may be added to the coated film after applying the coating fluid onto the substrate.

(Application of Optically Anisotropic Films)

While the optically anisotropic film according to the present invention is used for various optical elements, utilizing optically anisotropy, particularly, the optically anisotropic film can be preferably used as a polarizing plate and a phase-contrast plate. In this case, the dichroic ratio of the optically anisotropic film is preferably 20 or greater, more preferably 30 or greater at a wavelength of 600 nm.

Applications of the optically anisotropic film according to the present invention include, for instance, office automation appliances, such as personal computer monitors, laptop computers, copy machines or the like, portable devices, such as mobile phones, watches, digital cameras, Personal Digital Assistance (PDA), portable game devices or the like, home appliances, such as video cameras, television units, and microwave ovens or the like, car appliances, such as rear-view monitors, monitors for car navigation system, and car audio videos or the like, displays, such as monitors for information for stores, and security gizmos, such as supervisory monitors, and liquid crystal display devices, such as care giving monitors and monitors for medical purposes or the like.

EXAMPLE AND COMPARATIVE EXAMPLES

Synthesis of Compound 1

An azo-base compound 1 containing a sulfonic acid group was synthesized as shown in the following synthetic scheme:

(Chemical formula 2)

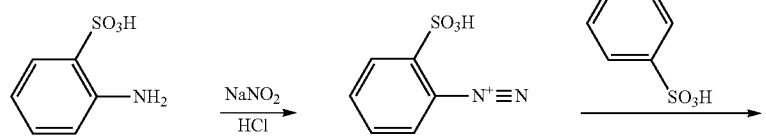

-continued

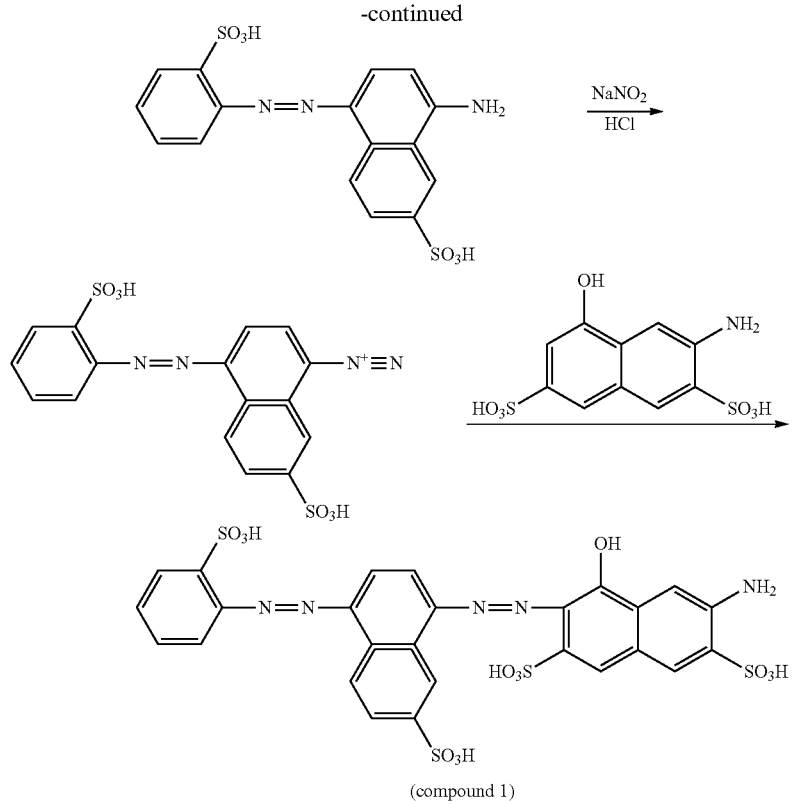

(compound 1)

Example

To an acid solution containing a compound 1 and water having a pH of 2.6 (21° C.) and a solid content concentration of 18.9% by weight, 5% by weight of ammonium hydroxide was mixed dropwise to prepare a coating fluid by adjusting the pH to be 7.0 (21° C.). The range of the solid content concentration exhibiting liquid crystallinity of the coating fluid at 60° C. was 20% to 26% by weight as shown in table 1.

To a surface of a glass plate (MATSUNAMI MICRO SLIDE GLASS), the coating fluid was cast in a thin film state while applying a shearing stress using a barcoater (produced by Buschman Corporation, mayer rot HS1.5) and then dried naturally in a room at 23° C. to prepare a polarizing film (optically anisotropic film) having a single transmittance of 40.5%. The dichroic ratio of this polarizing film at a wavelength of 600 nm was 24 as shown in table 1.

Comparative Example 1

A coating fluid and a polarizing film were prepared in the same manner as Example 1 except for the use of sodium hydroxide as a substitute for ammonium hydroxide. As shown in table 1, the range of the solid content concentration exhibiting liquid crystallinity of this coating fluid was 23% to 25% by weight and the dichroic ratio of the polarizing film was 6.

Comparative Example 2

A coating fluid and a polarizing film were prepared in the same manner as Example 1 except for the use of triethylamine as a substitute for ammonium hydroxide. As shown in table 1, the range of the solid content concentration exhibiting liquid crystallinity was 23% to 25% by weight and the dichroic ratio of the polarizing film was 7.

Comparative Example 3

A coating fluid and a polarizing film were prepared in the same manner as Example 1 except for not mixing ammonium hydroxide dropwise. As shown in table 1, the range of the solid content concentration exhibiting liquid crystallinity of this coating fluid was 23% to 25% by weight and the dichroic ratio of the polarizing film was 18.

TABLE 1

| | Alkaline agent | pH (21° C.) | Range of solid content concentration exhibiting liquid crystallinity (% by weight) (60° C.) | Dichroic ratio |
| --- | --- | --- | --- | --- |
| Example | Ammonium hydroxide | 7.0 | 20-26 | 24 |
| Comparative Example 1 | Sodium hydroxide | 7.0 | 23-25 | 6 |
| Comparative Example 2 | Triethyl-amine | 7.0 | 23-25 | 7 |
| Comparative Example 3 | Nil | 2.6 | 23-25 | 18 |

(Assessment)

In the case of neutralization with ammonium hydroxide as Example 1 of the present invention, a coating fluid having a wide range of solid content concentration that exhibits liquid crystallinity can be obtained. On the other hand, as shown in Comparative Examples 1 and 2, in the case of neutralizing the acid solution with sodium hydroxide or triethylamine, its solid content concentration range exhibiting liquid crystallinity is narrow. Further, even in the case of not neutralizing with an alkaline agent as Comparative Example 3, its solid content concentration range is narrow.

Moreover, the optically anisotropic film obtained by the coating fluid neutralized with ammonium hydroxide as in the Example of the present invention exhibits a high dichroic ratio. On the other hand, the optically anisotropic film obtained by the coating fluid neutralized with sodium hydroxide or triethylamine as Comparative Examples 1 and 2 has an extremely low dichroic ratio. The optically anisotropic film obtained by the coating fluid without neutralization by an alkaline agent as Comparative Example 3 has a low dichroic ratio, either.

Furthermore, similar effects can be obtained in the solid content concentration range and the dichroic ratio in the range of a pH value of 4 to 9, when the coating fluid of the present invention contains ammonium hydroxide.

(Measurement Method in a Solid Content Concentration Range)

The concentration range that a solution exhibits was identified as below. A plurality of samples having different concentration were prepared. Each of the samples was sandwiched by 2 pieces of glass slides to be installed on a hot stage at 60° C. (produced by Mettler-Toledo International Inc., FP28HT). Subsequently, the existence of an optical pattern of a liquid crystal phase was identified by observing under crossed nicols.

(Measurement Method of Dichroic Ratio and Single Transmittance)

Measurement method for dichroic ratio: With the use of a spectrophotometer with Glan-Thompson polarizer (produced by JASCO Corporation, U-4100), measured light of linear polarizer at a wavelength of 600 nm was allowed to enter to obtain $k_1$ and $k_2$ by the calculation of the following equations:

$$\text{Dichroic ratio} = \log(1/k_2)/\log(1/k_1) \quad \text{Equation:}$$

$$\text{Single transmittance} = (k_1+k_2)/2 \quad \text{Equation:}$$

wherein $k_1$ represents the transmittance of linear polarization in the maximum transmittance direction and $k_2$ represents the transmittance of linear polarization in the direction orthogonal to the direction of the maximum transmittance.

There have thus been shown and described novel processes for producing a coating fluid and an optically anisotropic film, which fulfill all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A process for producing a coating fluid comprising a step of adjusting a pH of the coating fluid by mixing ammonium hydroxide into an acid solution containing a lyotropic liquid crystal compound and a solvent.

2. The process according to claim 1, wherein the mixed quantity of ammonium hydroxide is 0.1 to 10 weight parts with respect to 100 weight parts of the lyotropic liquid crystal compound.

3. The process according to claim 1, wherein M represents a cation and the lyotropic liquid crystal compound contains at least one of —$SO_3M$ group and —COOM group.

4. The process according to claim 2, wherein M represents a cation and the lyotropic liquid crystal compound contains at least one of —$SO_3M$ group and —COOM group.

5. The process according to claim 1, wherein the acid solution has a PH of 3 or lower.

6. The process according to claim 2, wherein the acid solution has a PH of 3 or lower.

7. The process according to claim 3, wherein the acid solution has a PH of 3 or lower.

8. The process according to claim 4, wherein the acid solution has a PH of 3 or lower.

9. The process according to claim 1, wherein the coating fluid is adjusted to have a PH of 4 to 8 by mixing ammonium hydroxide.

10. The process according to claim 1, wherein the coating fluid has a solid content concentration of 10% to 30% by weight.

11. The process according to claim 9, wherein the coating fluid has a solid content concentration of 10% to 30% by weight.

12. The process according to claim 1, wherein the coating fluid exhibits liquid crystallinity in a range that the solid content concentration is at least 20% to 25% by weight at 60° C.

13. The process according to claim 9, wherein the coating fluid exhibits liquid crystallinity in a range that the solid content concentration is at least 20% to 25% by weight at 60° C.

14. The process according to claim 10, wherein the coating fluid exhibits liquid crystallinity in a range that the solid content concentration is at least 20% to 25% by weight at 60° C.

15. The process according to claim 11, wherein the coating fluid exhibits liquid crystallinity in a range that the solid content concentration is at least 20% to 25% by weight at 60° C.

16. A process for producing an optically anisotropic film comprising a step of obtaining an optically anisotropic film by casting the coating fluid produced by the process for production of the coating fluid according to claim 1 in a thin film state, followed by drying.

17. The process for producing an optically anisotropic film according to claim 16, wherein the optically anisotropic film has a thickness of 0.1 to 1 μm.

* * * * *